US007472064B1

(12) United States Patent
Guo et al.

(10) Patent No.: US 7,472,064 B1
(45) Date of Patent: Dec. 30, 2008

(54) METHOD AND SYSTEM TO SCALE DOWN A DECISION TREE-BASED HIDDEN MARKOV MODEL (HMM) FOR SPEECH RECOGNITION

(75) Inventors: Qing Guo, Beijing (CN); Yonghong Yan, Beijing (CN); Baosheng Yuan, Singapore (SG)

(73) Assignee: Intel Corporation, Santa Clara, CA (US)

(*) Notice: Subject to any disclaimer, the term of this patent is extended or adjusted under 35 U.S.C. 154(b) by 934 days.

(21) Appl. No.: 10/019,381

(22) PCT Filed: Sep. 30, 2000
(Under 37 CFR 1.47)

(86) PCT No.: PCT/CN00/00299

§ 371 (c)(1),
(2), (4) Date: Sep. 8, 2003

(87) PCT Pub. No.: WO02/29614

PCT Pub. Date: Apr. 11, 2002

(51) Int. Cl.
*G10L 15/14* (2006.01)
(52) U.S. Cl. .................................. 704/256.2
(58) Field of Classification Search ............... 704/256.2, 704/256.5
See application file for complete search history.

(56) References Cited

U.S. PATENT DOCUMENTS 5,684,924 A 11/1997 Stanley et al.
5,899,973 A * 5/1999 Bandara et al. ........... 704/256.2
6,324,510 B1 * 11/2001 Waibel et al. ............ 704/256.7

FOREIGN PATENT DOCUMENTS

WO WO-96/13830 5/1996

OTHER PUBLICATIONS

Bub, Udo, "Task Adaptation for Dialogues Via Telephone Lines", *ICSLP*, Fourth International Conference on Spoken Language Processing, (Oct. 6, 1996), 825-828.
Digalakis, Vassilios V., et al., "Speaker Adaptation Using Canstrained Estimation of Gaussian Mixtures", *IEEE Transactions on Speech and Audio Processing*, vol. 3, No. 5, (Sep. 1995), Whole Document.
Digalakis, Vassilios V., et al., "Speaker Adaptation Using Combined Transformation and Bayesian Methods", *IEEE Transactions on Speech and Audio Processing*, vol. 4, No. 4, (Jul. 1996), Whole Document.

(Continued)

*Primary Examiner*—Angela A Armstrong
(74) *Attorney, Agent, or Firm*—Blakely, Sokoloff, Taylor & Zafman LLP

(57) ABSTRACT

A method and system are provided in which a decision tree-based model ("general model") is scaled down ("trim-down") for a given task. The trim-down model can be adapted for the given task using task specific data. The general model can be based on a hidden markov model (HMM). By allowing a decision tree-based acoustic model ("general model") to be scaled according to the vocabulary of the given task, the general model can be configured dynamically into a trim-down model, which can be used to improve speech recognition performance and reduce system resource utilization. Furthermore, the trim-down model can be adapted/adjusted according to task specific data, e.g., task vocabulary, model size, or other like task specific data.

23 Claims, 6 Drawing Sheets

OTHER PUBLICATIONS

Hon, Hsiao-Wuen, et al., "On Vocabulary-Independent Speech Modeling", *ICASSP 90 vol. 2, S2VA, Speech Processing 2, VLSI, Audio and Electroacoustics*, International Conference on Acoustics, Speech, and Signal Processing, (Apr. 6, 1990), 725-728.

Hwang, Mei-Yuh, et al., "Dynamically Configurable Acoustics Models for Speech Recognition", *Proceedings of the 1998 IEEE International Conference on Acoustics, Speech and Signal Processing*, vol. II of VI, Speech Processing II, Neural Networeks for SignalProcessing, (may 15, 1998), 669-672.

* cited by examiner

METHOD AND SYSTEM TO SCALE DOWN A DECISION TREE-BASED HIDDEN MARKOV MODEL (HMM) FOR SPEECH RECOGNITION

FIELD OF THE INVENTION

The present invention relates generally to speech processing and to automatic speech recognition systems (ASR). More particularly, the present invention relates to a method and system to scale down a decision tree-based hidden markov model (HMM) for speech recognition.

BACKGROUND OF THE INVENTION

A speech recognition system recognizes a collection of spoken words ("speech") into recognized phrases or sentences. A spoken word typically includes one or more phones or phonemes, which are distinct sounds of a spoken word. Thus, to recognize speech, a speech recognition system must determine relationships between the words in the speech. A common way of determining relationships between words in recognizing speech is by using a general-purpose acoustical model ("general model") based on a hidden markov model (HMM).

Typically, a HMM is a decision tree-based model in which the HMM uses a series of transitions from state to state to model a letter, a word, or a sentence. Each arc of the transitions has an associated probability, which gives the probability of the transition from one state to the next at an end of an observation frame. As such, an unknown speech signal can be represented by ordered states with a given probability. Moreover, words in an unknown speech signal can be recognized by using the ordered states of the HMM. The HMM, however, can place a heavy burden on system resources.

Thus, a challenge for speech recognition systems is how to utilize system resources for improving the performance of using a general model such as the HMM. A disadvantage of using the general model is that it is trained for broad use from a very large vocabulary, which can lead to poor performance for special applications related to specific vocabulary. For example, a mismatch between speaker characteristics, transmission channels, training data, etc., can degrade speech recognition performance using the general model. Another disadvantage of the general model is that it requires extensive computation costs and high resource utilization.

BRIEF DESCRIPTION OF THE DRAWINGS

The features and advantages of the present invention are illustrated by way of example and not intended to be limited by the figures of the accompanying drawings in which like references indicate similar elements, and in which.

DETAILED DESCRIPTION

According to one aspect of the invention, a method and system are provided in which a decision tree-based model ("general model") is scaled down ("trim-down") for a given task. The trim-down model can be adapted for the given task using task specific data. The general model can be based on a hidden markov model (HMM) and can be trained through a large scale general purpose (task-independent) speech database.

By allowing a decision tree-based acoustic model ("general model") to be scaled according to the vocabulary of the given task, the general model can be configured dynamically into a trim-down model, which can be used to improve speech recognition performance and reduce system resource utilization. Furthermore, the trim-down model can be adapted/adjusted according to task specific data, e.g., task vocabulary, model size, or other like task specific data.

Figure 1:
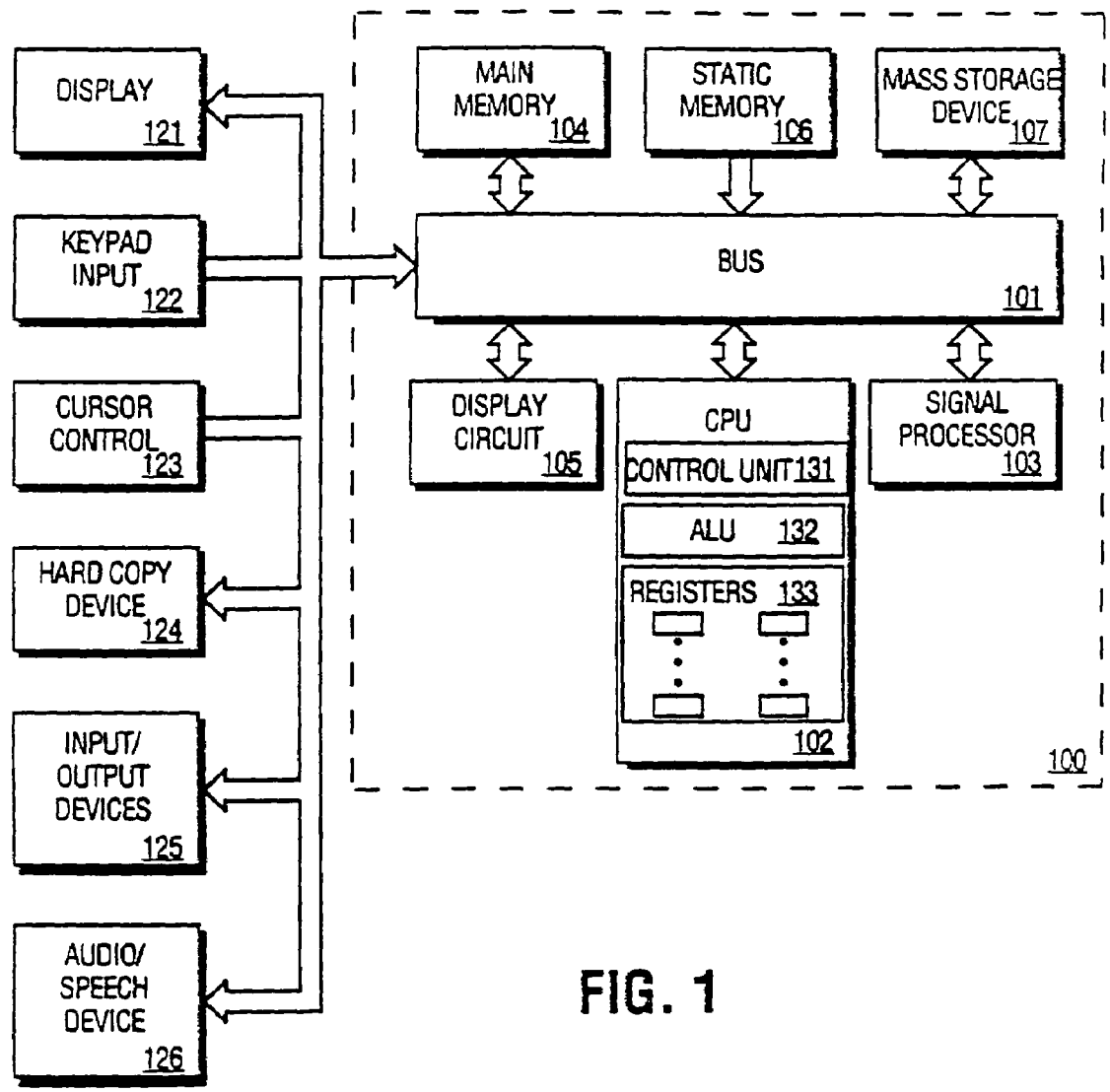
FIG. 1 is a diagram illustrating an exemplary digital processing system for implementing the present invention.

FIG. 1 is a diagram illustrating an exemplary digital processing system 100 for implementing the present invention. The speech processing and speech recognition techniques described herein can be implemented and utilized within digital processing system 100, which can represent a general purpose computer, portable computer, hand-held electronic device, or other like device. The components of digital processing system 100 are exemplary in which one or more components can be omitted or added. For example, one or more memory devices can be utilized for digital processing system 100.

Referring to FIG. 1, digital processing system 100 includes a central processing unit 102 and a signal processor 103 coupled to a display circuit 105, main memory 104, static memory 106, and mass storage device 107 via bus 101. Digital processing system 100 can also be coupled to a display 121, keypad input 122, cursor control 123, hard copy device 124, input/output (I/O) devices 125, and audio/speech device 126 via bus 101.

Bus 101 is a standard system bus for communicating information and signals. CPU 102 and signal processor 103 are processing units for digital processing system 100. CPU 102 or signal processor 103 or both can be used to process information and/or signals for digital processing system 100. Signal processor 103 can be used to process speech or audio information and signals for speech processing and recognition. Alternatively, CPU 102 can be used to process speech or audio information and signals for speech processing or recognition. CPU 102 includes a control unit 131, an arithmetic logic unit (ALU) 132, and several registers 133, which are used to process information and signals. Signal processor 103 can also include similar components as CPU 102.

Main memory 104 can be, e.g., a random access memory (RAM) or some other dynamic storage device, for storing information or instructions (program code), which are used by CPU 102 or signal processor 103. For example, main memory 104 may store speech or audio information and instructions to be executed by signal processor 103 to process the speech or audio information. Main memory 104 may also store temporary variables or other intermediate information during execution of instructions by CPU 102 or signal processor 103. Static memory 106, can be, e.g., a read only memory (ROM) and/or other static storage devices, for storing information or instructions, which can also be used by CPU 102 or signal processor 103. Mass storage device 107 can be, e.g., a hard or floppy disk drive or optical disk drive, for storing information or instructions for digital processing system 100.

Display 121 can be, e.g., a cathode ray tube (CRT) or liquid crystal display (LCD). Display device 121 displays information or graphics to a user. Digital processing system 101 can interface with display 121 via display circuit 105. Keypad input 122 is a alphanumeric input device for communicating information and command selections to digital processing system 100. Cursor control 123 can be, e.g., a mouse, a trackball, or cursor direction keys, for controlling movement of an object on display 121. Hard copy device 124 can be, e.g., a laser printer, for printing information on paper, film, or some other like medium. A number of input/output devices 125 can be coupled to digital processing system 100. For example, a speaker can be coupled to digital processing system 100. Audio/speech device 126 can be, e.g., a microphone with an analog to digital converter, for capturing sounds of speech in an analog form and transforming the sounds into digital form, which can be used by signal processor 203 and/or CPU 102, for speech processing or recognition.

The speech processing techniques described herein can be implemented by hardware and/or software contained within digital processing system 100. For example, CPU 102 or signal processor can execute code or instructions stored in a machine-readable medium, e.g., main memory 104, to process or to recognize speech.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions can be represented by carrier wave signals, infrared signals, digital signals, and by other like signals.

Figure 2:
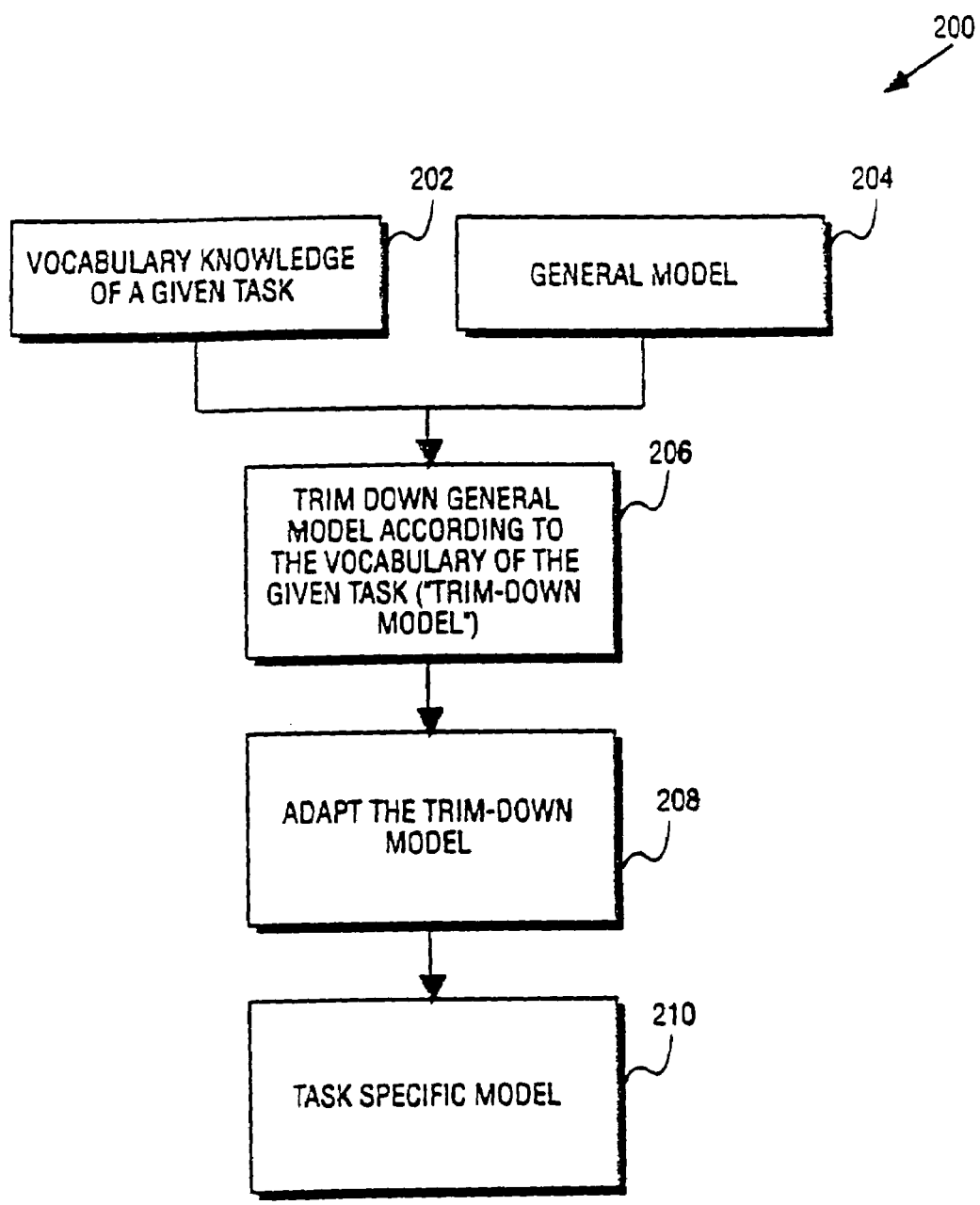
FIG. 2 is a flow chart illustrating an operation to scale a general model into a task specific model according to one embodiment.

FIG. 2 is a flow chart illustrating an operation 200 to scale a general model into a task specific model according to one embodiment. Operation 200 includes two parts. The first part relates to how the general model is scaled by the vocabulary of the given task to create a trim-down model. The second part relates to adapting the trim-down model based on task specific data to create a task specific model. These two parts of operation 200 can be used separately or in combination.

Referring to FIG. 2, at operations 202 and 204, vocabulary knowledge of a given task and a general model are input to a trim-down operation 206 for reducing the general model according to the vocabulary of a given or specific task into a "trim-down model".

The general model may be a general-purpose acoustical model such as the HMM. For example, the general model may be a decision tree-based HMM. The general model may include an exhaustive list of words for a given language. The vocabulary knowledge of the given task, however, may include only a small subset of the general model. For example, the vocabulary knowledge of the given task may be related to "weather reporting" and include words and phrases such as, for example, "cloudy," "rain today," "temperature," "humidity," "the temperature today will be," etc.

At operation 206, the general model is trimmed down according to the vocabulary of the given task to create a "trim-down model." The trim-down operation 206 allows a general model to be scaled for use by specific vocabulary instead of having to use the exhaustive vocabulary of the general model.

At operation 208, the trim-down model is adapted with task specific data to configure the trim-down model according to specific task requirements such as, for example, task specific vocabulary, model size, etc. For example, the trim-down model can be trained for a task dependent model.

At operation 210, a task specific model can be obtained after adapting the trim-down model. For example, a general model can be scaled down for a given task such as, for example, weather reporting and adapted with weather reporting specific data to create a task specific model for weather reporting. Thus, operation 200 provides a fast and accurate task specific model for recognizing speech of the given task by downsizing or scaling a general model for the given task.

FIGS. 3A through 3D are exemplary diagrams illustrating how decision trees can be scaled. For purposes of illustration, the decision trees are trees based on decision tree state clustering for a general model such as the HMM. In the following examples of FIGS. 3A through 3D, child nodes or leaf nodes of the same parent node represent HMM states of similar acoustic realization. Parameters under child or leaf nodes are clustered down to a smaller size. Each HMM state represents a triphone unit. A triphone unit includes a phone or phoneme having a left and right context.

Furthermore, each node of the decision trees is related to a question regarding the phonetic context of the triphone clusters with the same central phone. A set of states can be recursively partitioned into subsets according to the phonetic questions at each tree node if traversing the decision tree from the root to its leaves. States reaching the same child or leaf node on the decision tree are regarded as similar and the number of child or leaf nodes determines the number of states.

The following exemplary decision trees illustrate the rules for merging nodes of a decision tree of a general model. That is, if all the child or leaf nodes from a parent node do not occur in the given task, the child or leaf nodes will merge with the parent node. In addition, if all the child or leaf nodes from a parent node do occur in the given task, the child or leaf nodes will not merge with the parent node. Furthermore, if any parent node having incomplete descendants (i.e., descendants that do not occur in the given task), it will be replaced by its child or leaf node, which does have complete descendants.

Figure 3A:
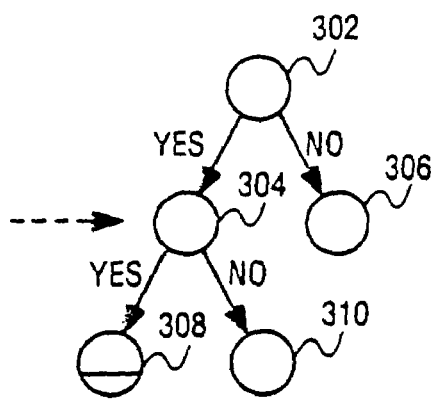
FIGS. 3A through 3D are exemplary diagrams illustrating how decision trees can be scaled.
Figure 3B:
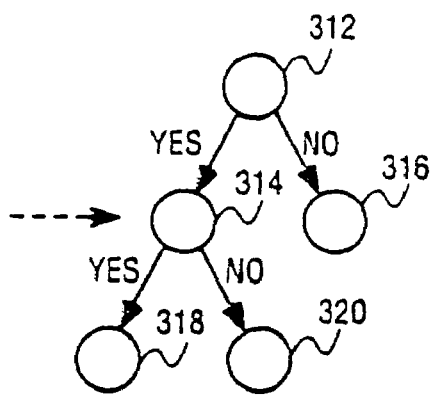

FIGS. 3A and 3B illustrate if all of the child or leaf nodes from a parent node do not occur in the given task, the child or leaf nodes will merge with the parent node. Referring to FIG. 3A, an exemplary decision tree is shown having a plurality of nodes 302 through 310. A node labeled with a line ("-") through it refers to a node that occurs in a given task. Node 308 refers to a node that occurs in the given task. For example, node 308 may refer to the word "cloudy" for the given task of "weather reporting." For one implementation, during a trim-down operation, nodes like node 308 and 310 will merge with its parent node 304 because not all of the child or leaf nodes from its parent node 304 occur in the given task. Referring to FIG. 3B, another exemplary decision tree is shown having a plurality of nodes 312 through 320. The decision tree has no nodes labeled with a line ("-") through it. Thus, for another implementation, during a trim-down operation, child or leaf nodes like nodes 318 and 320 will merge with its parent node 314 because they do not occur in the given task.

Figure 3C:
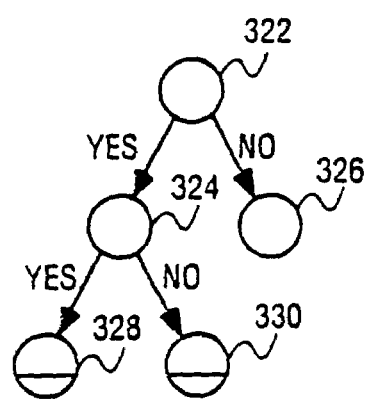

FIG. 3C illustrates if all of the child or leaf nodes from a parent node do occur in the given task, the child or leaf nodes will not merge with the parent node. Referring to FIG. 3C, an exemplary decision tree is shown having a plurality of nodes 322 through 330. A node labeled with a line ("-") through it refers to a node that occurs in a given task. The nodes 328 and 330 refer to a node that occurs in the given task. Thus, for another implementation, during a trim-down operation, nodes 328 and 330 will not merge with its parent node 324.

Figure 3D:
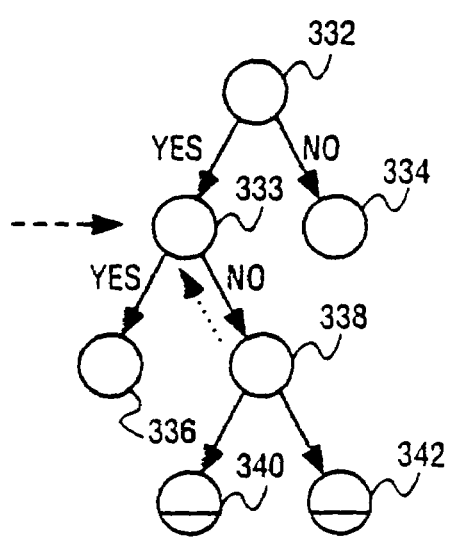

FIG. 3D illustrates that if any parent node having incomplete descendants (i.e., descendants that do not occur in the given task), it will be replaced by its child or leaf node, which does have complete descendants. Referring to FIG. 3D, an exemplary decision tree is shown having a plurality of nodes 332 through 342. The parent node 333 has child or leaf nodes that are incomplete, however, child or leaf node 338 has complete descendants, i.e., nodes 340 and 342. Thus, node 338 will merge with parent node 333. Node 336 may also merge with parent node 333 following the rules set forth in FIGS. 3A and 3B.

Figure 4:
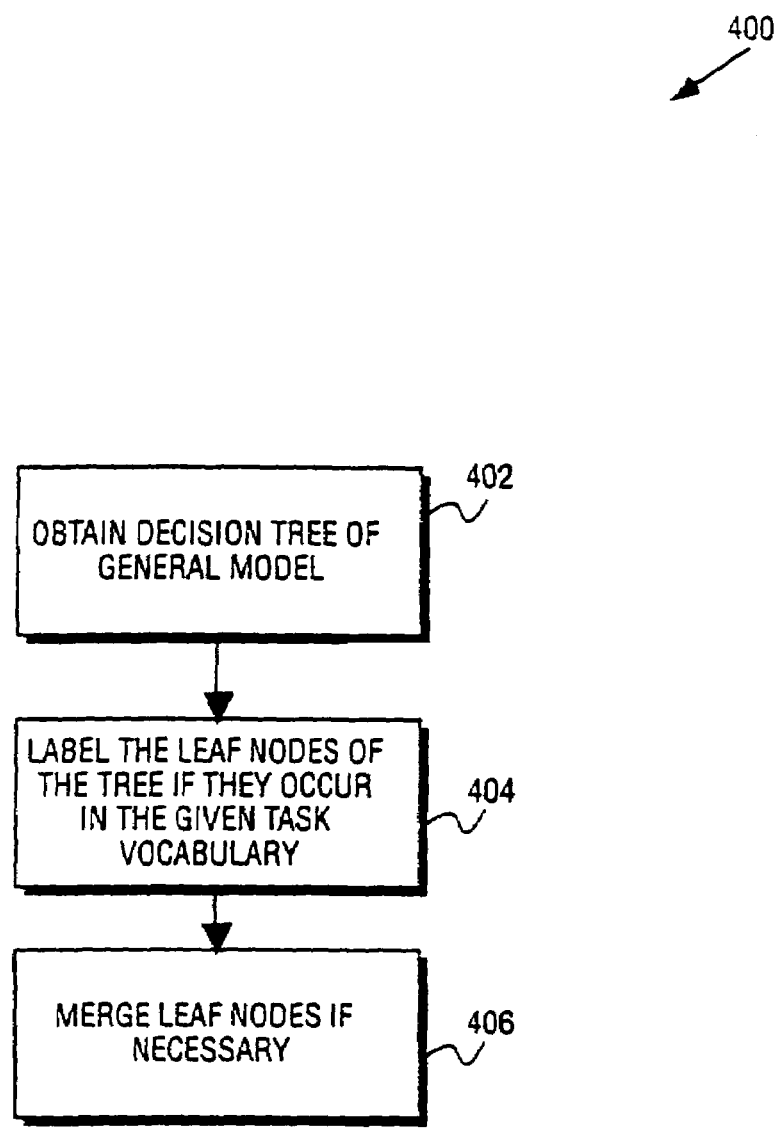
FIG. 4 is a flow chart illustrating a trim-down operation according to one embodiment.

FIG. 4 is a flow chart illustrating in further detail the trim-down operation 206 of FIG. 2 according to one embodiment. Referring to FIG. 4, at operation 402, a decision tree of a general model is obtained. The decision tree can be similar to the exemplary decision trees shown in FIGS. 3A through 3D.

At operation 404, leaf nodes of the are labeled if they occur in the given task vocabulary. For example, as shown in FIG. 3A, node 308 is labeled as having occurred in the given task.

At operation 406, leaf nodes are merged if necessary. For one implementation, as illustrated in FIGS. 3A and 3B, if all of the child or leaf nodes from a parent node do not occur in the given task, the child or leaf nodes will merge with the parent node. For another implementation, as illustrated in FIG. 3C, if all of the child or leaf nodes from a parent node do occur in the given task, the child or leaf nodes will not merge with the parent node. For another implementation, as illustrated in FIG. 3D, if any parent node having incomplete descendants (i.e., descendants that do not occur in the given task, it will be replaced by its child or leaf node, which does have complete descendants.

The merged nodes in the trim-down operation 206 can be represented by mixed gaussian distributions to achieve high performance in speech recognition systems. For example, given two leaf ("child") nodes $n_1$ and $n_2$, with Gaussian distributions $G_1 = N(\mu_1, \Sigma_1)$ and $G_2 = N(\mu_2, \Sigma_2)$, respectively, using a Baum-Welch ML estimate, the following two equations can be used:

$$\mu_1 = \sum_{x \in X} \frac{\gamma(x)x}{a} \qquad (1)$$

$$\sum_1 = \sum_{x \in X} \frac{\gamma(x)(x-\mu_1)(x-\mu_1)T}{a} \qquad (2)$$

where X={speech data aligned to Gaussian $G_1$ with occupancy count $\gamma(x)$ for each data x}, $$a = \sum_{x \in X} \gamma(x)$$

is total occupancy of Gaussian $G_1$ in the training data. Furthermore, assuming that both sets of data X and Y are modeled by the combined Gaussian $G = N(\mu, \Sigma)$, i.e., when the two leaf nodes $n_1$ and $n_2$ are merged together. The following merged mean and variance can be computed as follows:

$$\mu = \frac{a}{a+b}\mu_1 + \frac{b}{a+b}\mu_2 \qquad (3)$$

-continued $$\sum \frac{a}{a+b}\left\{\sum_1 + (\mu_1 - \mu)(\mu_1 - \mu)^T\right\} + \frac{a}{a+b}\left\{\sum_2 + (\mu_2 - \mu)(\mu_2 - \mu)^T\right\} \qquad (4)$$

where $$b = \sum_{y \in Y} \gamma(y)$$

is total occupancy of Gaussian $G_2$ in the training data.

Figure 5:
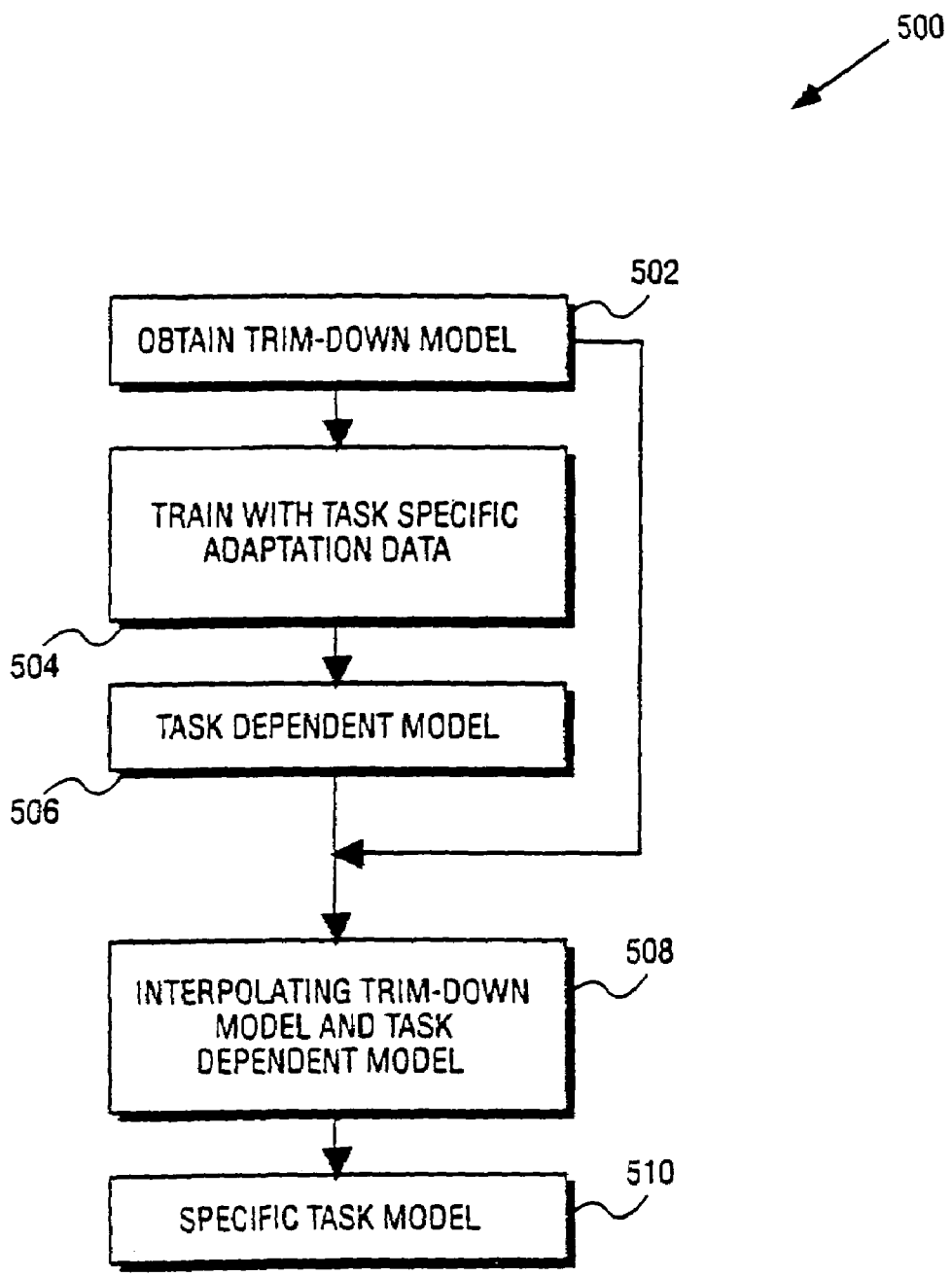
FIG. 5 is a flow chart illustrating a task adapting and interpolating operation according to one embodiment.

FIG. 5 is a flow chart illustrating a task adapting and interpolating operation 500 according to one embodiment. Referring to FIG. 5, at operation 502, a trim-down model of a general model is obtained. For example, the operation 206 can be used to obtain a trim-down model.

At operation 504, the trim-down model is trained with task specific adaptation data. The task adaptation data can be used to adapt the general model (using the trim-down model) for the vocabulary of the given task. At operation 506, a task dependent model is derived after the training process of operation 504 using the trim-down model and the task specific adaptation data.

At operation 508, the trim-down model and task dependent model can be interpolated. The interpolation process can use an approximate maximum a posterior (AMAP) estimation process as will be explained in FIG. 6.

At operation 510, a specific task model is generated after interpolating the trim-down model and the task dependent model.

Figure 6:
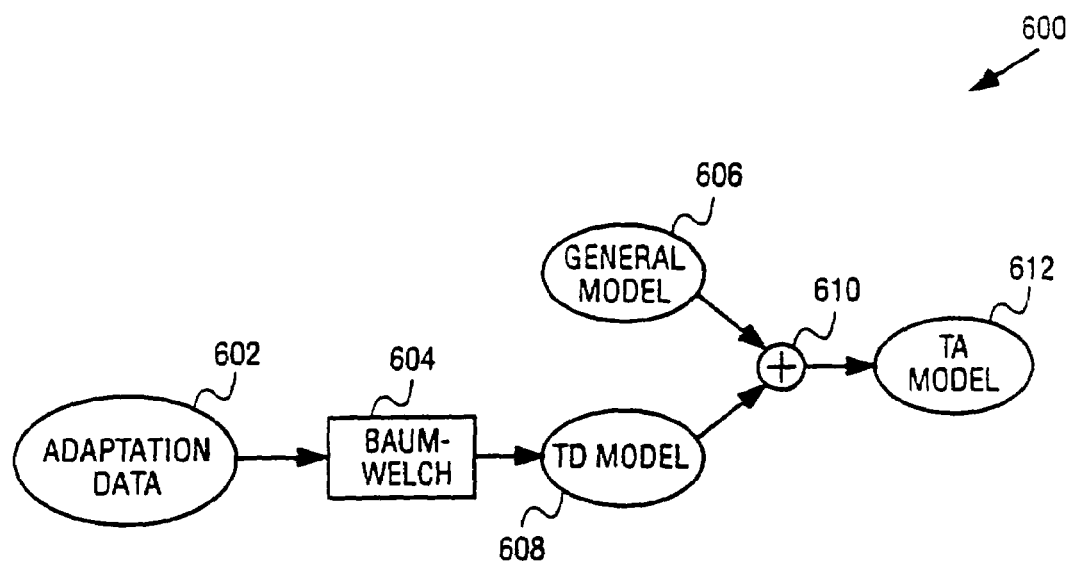
FIG. 6 is a flow diagram illustrating an interpolation process according to one embodiment.

FIG. 6 is a flow diagram illustrating an interpolation process (AMAP) 600 according to one embodiment. Referring to FIG. 6, at functional block 602, adaptation data is input to a Baum-Welch process to obtain a posterior probability. The posterior probability can be obtain as follows.

Suppose that $\gamma_t(s_t)$ is the probability of being at state $s_t$ at time t given the current HMM parameters, and $\phi_u(s_t)$ is the posterior probability of the ith mixture component.

$$\phi_{it}(s_t) = p(\omega_i \mid x_t, s_t) = \frac{p(\omega_i \mid x_t) N\left(x_i; \mu_i, \sum_i\right)}{\sum_{j=1}^{M} p(\omega_j \mid x_i) N(x_i; \mu_j; \mu_j)}$$

At functional blocks 606, 608, and 610, an approximate MAP (AMAP) estimation scheme can be implemented by linearly combining the general model and a task dependent model (TD model) with task specific counts for each component density.

$$\langle x \rangle_i^{AMAP} = \lambda \langle x \rangle_i^{SI} + (1-\lambda) \langle x \rangle_i^{SD}$$

$$\langle xx^T \rangle_i^{AMAP} = \lambda \langle xx^T \rangle_i^{SI} + (1-\lambda) \langle xx^T \rangle_i^{SD}$$

$$n_i^{AMAP} = \lambda n_i^{SI} + (1-\lambda) n_i^{SD}$$

Where the superscripts on the right-hand side denote the data over which the following statistics (counts) are collected during one iteration of the forward-backward algorithm.

$$\langle x \rangle_i = \sum_{i,s_i} \gamma_t(s_t)\phi_{it}(s_t)x_t$$

$$\langle xx^T \rangle_i = \sum_{i,s_i} \gamma_t(s_t)\phi_{it}(s_t)x_t x_t^T$$

$$n_i = \sum_{i,s_i} \gamma_t(s_t)\phi_{it}(s_t)$$

Where the weight λ controls the adaptation rate. Using the combined counts, we can compute the AMAP estimates of the means and covariances of each Gaussian component density from $$\mu_i^{AMAP} = \frac{\langle x \rangle_i^{AMAP}}{n_i^{AMAP}}$$

$$\sum_i^{AMAP} = \frac{\langle xx^T \rangle_i^{AMAP}}{n_i^{AMAP}} - \mu_i^{AMAP}(\mu_i^{AMAP})^T.$$

At functional block 612, a task adaptation model or a task specific model is obtained by the combination of the general model and the task dependent model.

The following is exemplary high level code for implementing a trim-down operation to scale a general model. For example, the trim-down operation as described herein can be implemented using the following exemplary code. Furthermore, the trim-down operation can be implemented with any standard programming language such as, for example, "C" or "C++."

```
#include "hmm/hmmphys.h"
#include "hmm/hmmparam.h"
#include "hmm/hmmmap.h"
#include "hmm/hmmlist.h"
#include "hmm/phnenc.h"
#include "hmm/phnname.h"
#include "hmm/mono.h"
#include "dcstree/question.h"
#include "statis/statis.h"
#include "dcstree.h"
#include "dsizemodel_voc.h"
#include "logmath.h"
#include "exscan.h"
extern HMMPhysical *hmmphys;
extern HMMParam *hmmparam;
extern HMMMap *hmmmap;
extern DcsTreeQuestion *dtq;
extern STATIS *hmmocc;
extern ExStateScan *exscan;
extern MonoPhone *mono;
extern float *newWgtSet;
extern float *newMeanSet;
extern float *newVarSet;
extern int *newNmixSet;
extern int *newMixSet;
/* This function combine the nodes with none or only one child node can be traversed from the
vocabulary list */
int DSizeModel::VocMergeNodes_M(aDcsTreeNode *node,int magic,int newstate) {
    printf("entering node%d\n",node->id);
    node->magic=magic;
    if (node->Voc_Exist>=0) return newstate;
    if (node->Voc_Exist==-1) {
        if (!node->yes) return newstate;
        if (node->yes->Voc_Exist==-1)
            newstate=VocMergeNodes_M(node->yes,magic,newstate);
        if (node->no->Voc_Exist==-1)
            newstate=VocMergeNodes_M(node->no,magic,newstate);
    }
    if ((node->yes->Voc_Exist>=2) || (node->no->Voc_Exist>=2)) {
        node->Voc_Exist=node->yes->Voc_Exist+node->no->Voc_Exist;
        return newstate;
    }
    if ((node->yes->Voc_Exist==1)&&(node->no->Voc_Exist==1)) {
        node->Voc_Exist=2;
        return newstate;
    }
    if ((node->yes->Voc_Exist>=0)&&(node->no->Voc_Exist>=0)) {
        float cost=MergeGaussianCost(node->yes,node->no);
        //if (cost>=0.8e+10) { printf("cost=%13.2f\n");return newstate;}
        printf("Merge node%d and node%d, the lost cost=%10.2f\n",node->yes->id,node->no->id,cost);
        for (int sss=0; sss<nmix; sss++) {
            FinalCGLTop12[sss].combCost=CGLTop12[sss].combCost;
            FinalCGLTop12[sss].combWeight=CGLTop12[sss].combWeight;
```

```
                for (int ttt=0;ttt<DSvecSize;ttt++) {
                    FinalCGLTop12[sss].combMean[ttt]=CGLTop12[sss].combMean[ttt];
                    FinalCGLTop12[sss].combVar[ttt]=CGLTop12[sss].combVar[ttt];
                }
            }
        }
        CopyParam1(node->yes,node->no,newstate);
        printf("new state %d is generated successfully!\n",newstate);
        node->Voc_Exist=node->yes->Voc_Exist+node->no->Voc_Exist;
        node->state=newstate+newstatebase;
        node->occ=node->yes->occ+node->no->occ;
        newstate++;
        return newstate;
    }
    /* This function mark the nodes with one child node's Voc_Exist=0 */
    aDcsTreeNode * DSizeModel::VocMergeNodes_Refine(aDcsTreeNode *node,int magic,aDcsTreeNode
*temp_node) {
        printf("entering node%d\n",node->id);
        node->magic=magic;
        if (node->Voc_Exist<=1) return temp_node;
        if (node->Voc_Exist>=2) {
            if (!node->yes) { printf("Error\n"); return temp_node;}
            temp_node=VocMergeNodes_Refine(node->yes,magic,temp_node);
            temp_node=VocMergeNodes_Refine(node->no,magic,temp_node);
        }
        if (((node->yes->Voc_Exist>=2)&&(node->no->Voc_Exist==0)) || ((node->no->
Voc_Exist>=2)&&(node->yes->Voc_Exist==0))) {
            if (temp_node) {
                printf("Starting refinement,%d node is being replaced by %d node\n", node->id, temp_node->id);
                node->occ=node->yes->occ+node->no->occ;
                node->Voc_Exist=1000; /* mark with a large number which can not be achieved in general cases */
                return node;
            }
            return temp_node;
        }
        if ((nod->yes->Voc_Exist==1)&&(node->no->Voc_Exist==1)) {
            return node;
        }
        return node;
    }
}
float DSizeModel::MergeGaussianCost(aDcsTreeNode *a,aDcsTreeNode *b) {
    int esidx1=a->state;
    int esidx2=b->state;
    float a1,b1,minnmix,maxnmix;
    int mix1,mix2;
    int nmix1,nmix2;
    float *mean1,*var1,*mean2,*var2,*mean1_r,*var1_r,*mean2_r,*var2_r;
    int *newnmix=newNmixSet;
    int *newmix=newMixSet;
    if (esidx1<newstatebase) {
        if (a->occ<=0.0) a->occ=hmmocc->GetOcct(esidx1);
        mix1=hmmparam->ExState(esidx1)->mix;
        nmix1=hmmparam->ExState(esidx1)->nmix;
        mean1=hmmparam->Mean(mix1);
        var1=hmmparam->Var(mix1);
    } else {
        nmix1=newnmix[esidx1-newstatebase];
        mean1_r=newMeanSet+newmix[esidx1-newstatebase]*DSvecSize;
        var1_r=newVarSet+newmix[esidx1-newstatebase]*(DSvecSize+1);
    }
    if (esidx2<newstatebase) {
        if (b->occ<=0.0) b->occ=hmmocc->GetOcct(esidx2);
        mix2=hmmparam->ExState(esidx2)->mix;
        nmix2=hmmparam->ExState(esid2)->nmix;
        mean2=hmmparam->Mean(mix2);
        var2=hmmparam->Var(mix2);
    } else {
        nmix2=newnmix[esidx2-newstatebase];
        mean2_r=newMeanSet+newmix[esidx2-newstatebase]*DSvecSize;
        var2_r=newVarSet+newmix[esidx2-newstatebase]*(DSvecSize+1);
    }
    float *wgt1,*wgt2;
    if (esidx1<newstatebase)
        wgt1=hmmparam->Weight(hmmparam->ExState(esidx1));
    else
        wgt1=newWgtSet+newmix[esidx1-newstatebase];
    if (esidx2<newstatebase)
        wgt2=hmmparam->Weight(hmmparam->ExState(esidx2));
    else
```

-continued

```
            wgt2=newWgtSet+newmix[esidx2-newstatebase];
    float aa,bb;
    float SumVar[36];
    minnmix=(nmix1>nmix2)?nmix1:nmix2;
    maxnmix=(nmix1>nmix2)?nmix1:nmix2;
    if ((nmix!=nmix1) || (nmix!=nmix2)) {
            printf("ex%d and ex%d's Mixture Number mismatch, they are %d and
%d\n",esidx1,esidx2,nmix1,nmix2);
            /* Here we only choose the state with max Mixture Number's parameter as the newstate's parameter
*/
            for (int i=0;i<maxnmix;i++) {
                    if (nmix2>nmix1) {
                            if (esidx2<newstatebase) {
                                    mean2=hmmparam->Mean(mix2+i);
                                    var2=hmmparam->Var(mix2+i);
                            } else {
                                    mean2=mean2__r+i*DSvecSize;
                                    var2=var2__r+i*(DSvecSize+1);
                            }
                            CGLTop12[i].combWeight=wgt2[i];
                            for (int j=0,j<DSvecSize;j++) {
                                    CGLTop12[i].combMean[j]=mean2[j];
                                    CGLTop12[i].combVar[j]=var2[j+1];
                            }
                    } else {
                            if (esidx1<newstatebase) {
                                    mean1=hmmparam->Mean(mix1+i);
                                    var1=hmmparam->Var(mix1+i);
                            } else {
                                    mean1=mean1__r+i*DSvecSize;
                                    var1=var1__r+i*(DSvecSize+1);
                            }
                            CGLTop12[i].combWeight=wgt1[i];
                            for (int j=0;<DSvecSize;j++) {
                                    CGLTop12[i].combMean[j]=mean1[j];
                                    CGLTop12[i].combVar[j]=var1[j+1];
                            }
                    }
            }
            return -1.0;
    }
    for (int ii=0;ii<nmix;ii++) {
            aa=exp(wgt1[ii]);
            a1=a->occ*aa;
            if (esidx1<newstatebase) {
                    mean1=hmmparam->Mean(mix1+ii);
                    var1=hmmparam->Var(mix1+ii);
            } else {
                    mean1=mean1__r+ii*DSvecSize;
                    var1=var1__r+ii*(DSvecSize+1);
            }
            for (int jj=0;jj<nmix;jj++) {
                    bb=exp(wgt2[jj]);
                    b1=b->occ*bb;
                    if (esidx2<newstatebase) {
                            mean2=hmmparam->Mean(mix2+jj);
                            var2=hmmparam->Var(mix2+jj);
                    } else {
                            mean2=mean2__r+jj*DSvecSize;
                            var2=var2__r+jj*(DSvecSize+1);
                    }
                    CGL[ii*nmix+jj].combCost=0.0;
                    if (bhat) {
                            for (int i=0;i<DSvecSize;i++) {
                                    SumVar[i]=0.5*(1.0/var1[i+1]+1.0/var2[i+1]);
                            }
                    }
                    for (int i=0;i<DSvecSize;i++) {
                            CGL[ii*nmix+jj].combMean[i]=(a1*mean1[i]+b1*mean2[i])/(a1+b1);
                            CGL[ii*nmix+jj].combVar[i]=(a1*(1.0/var1[i+1]+(mean1[i]-CGL[ii*nmix+jj].combMean[i])*
(mean1[i]-CGL[ii*nmix+jj].combMean[i]))+b1*(1.0/var2[i+1]+(mean2[i]-CGL[ii*nmix+jj].combMean[i])*
(mean2[i]-CGL[ii*nmix+jj].CombMean[i])))/(a1+b1);
                            CGL[ii*nmix+jj].combWeight=(a1+b1)/(a->occ+b->occ);
                            if (!bhat) {
                                    CGL[ii*nmix+jj].combCost+=(a1+b1)*log(CGL[ii*nmix+jj].combVar[i])+a1*log(var1[i+1])+
b1*log(var2[i+1]);
                            }
                            /* Bhattacharyya Distance */
                            else {
```

-continued

```
                    CGL[ii*nmix+jj].combCost+=0.5*log(SumVar[i]+0.25*(log(var1[i+1])+log(var2[i+1]));
                    CGL[ii*nmix+jj].combCost)+=0.125*(mean1[i]-mean2[i])*(mean1[i]-
    mean2[i]/SumVar[i]+0.5*log(SumVar[i])+0.25*(log(var1[i+1])+log(var2[i+1]));
                }
            }
        }
    }
    /* sort the nmix*nmix distances to nmix */
    for (int topnmix=0;topnmix<nmix;topnmix++) {
        idx1[topnmix]=nmix+1;
        idx2[topnmix]=nmix+1;
    }
    bool notfirst=false;
    bool Rep=true;
    for (int topnmix=0;topnmix<nmix;topnmix++) {
        float minCost=1.0e+10;
        Rep=true;
        for (int iii=0;iii<nmix;iii++) {
            for (int jjj=0;jjj<nmix;jjj++) {
                if (notfirst) {
                    for (int counttopn=0;counttopn<topnmix;counttopn++) {
                        if (idx1[counttopn]==iii) Rep=false;
                    }
                    for (int counttopn=0;counttopn<topnmix;counttopn++) {
                        if (idx2[counttopn]==jjj) Rep=false;
                    }
                    if ((CGL(iii*nmix+jjj].combCost<minCost)&&Rep) {
                        minCost=CGL[iii*nmix+jjj].combCost;
                        idx1[topnmix]=iii;idx2[topnmix]=jjj;
                    }
                    Rep=true;
                }
                else {
                    if ((CGL[iii*nmix+jjj].combCost<minCost)) {
                        minCost=CGL[iii*nmix+jjj].combCost;
                        idx1[topnmix]=iii;idx2[topnmix]=jjj;
                        //notfirst=true;
                    }
                }
            }
        }
        notfirst=true;
        CGLTop12[topnmix].combCost=minCost;
        for (int ttt=0;ttt<DSvecSize;ttt++) {
            CGLTop12[topnmix].combMean[ttt]=CGL[idx1[topnmix]*nmix+idx2[topnmix]].combMean[ttt];
            CGLTop12[topnmix].combVar[ttt]=1.0/CGL[idx1[topnmix]*nmix+idx2[topnmix]].combVar[ttt];
        }
        CGLTop12[topnmix].combWeight=log(CGL[idx1[topnmix]*nmix+idx2[topnmix]].combWeight);
    }
    CGLTop12[nmix].combCost=0.0;
    for (int i=0; i<nmix; i++)
        CGLTop12[nmix].combCost+=CGLTop12[i].combCost;
        return CGLTop12[nmix].combCost;
}
void DSizeModel::CopyParam1(aDcsTreeNode *n1, aDcsTreeNode *n2, int newstate) {
    int esidx1=n1->state;
    int esidx2=n2->state;
    int nmix1,nmix2,maxnmix;
    int *newnmix=newNmixSet;
    if (esidx1<newstatebase) {
        nmix1=hmmparam->ExState(esidx1)->nmix;
    } else {
        nmix1=newnmix[esidx1-newstatebase];
    }
    if (esidx2<newstatebase) {
        nmix2=hmmparam->ExState(esidx2)->nmix;
    } else {
        nmix2=newnmix[esidx2-newstatebase];
    }
    maxnmix=(nmix1>nmix2)?nmix1:nmix2;
    //printf("nmaxmix=%d\n",nmaxmix);
    int *newmix;
    if (newstate==0) {
        newmix=newMixSet;
        newmix[newstate]=0;
    } else {
        newmix=newMixSet;
        newmix[newstate]=newmix[newstate-1]+newnmix[newstate-1];
    }
```

-continued

```
            newnmix[newstate]=maxnmix;
            float *newmean=newMeanSet+newmix[newstate]*DSvecSize;
            float *newvar=newVarSet+newmix[newstate]*(DSvecSize+1);
            float *newwgt=newWgtSet+newmix[newstate];
            for (int i=0;i<maxnmix;i++) {
                newwgt[i]=FinalCGLTop12[i].combWeight;
                float tempvar=0.0;
                for (int j=0;j<DSvecSize;j++) {
                    newmean[j]=FinalCGLTop12[i].combMean[j];
                    newvar[j+1]=FinalCGLTop12[i].combVar[j];
                    tempvar+=log(2.0*M_PI)-(float)log((double)newvar[j+1]);
                }
                newvar[0]=tempvar;
                newmean+=DSvecSize;
                newvar+=(DSvecSize+1);
            }
        }
    }
    int DSizeModel::GaussianDistance_voc(void) {
        printf("entering \n");
        printf("newstatebase=%d\n",newstatebase);
        int newstate=0;
        aDcsTreeNode *temp_node=NULL;
        FinalCGLTop12=(aCombGauss *)mem->Malloc(sizeof(aCombGauss)*nmix,true);
        CGLTop12=(aCombGauss *)mem->Malloc(sizeof(aCombGauss)*(nmix+1),true);
        TempCGLTop12=(aCombGauss *)mem->Malloc(sizeof(aCombGauss)*(nmix+1),true);
        CGL=(aCombGauss *)mem->Malloc(sizeof(aCombGauss)*nmix*nmix,true);
        idx1=(int *)mem->Malloc(sizeof(int)*nmix,true);
        idx2=(int *)mem->Malloc(sizeof(int)*nmix,true);
        for (int i=0;i<nmix+1;i++) {
            if (i<nmix) {
                FinalCGLTop12[i].combMean=(float *)mem->Malloc(sizeof(float)*DSvecSize,true);
                FinalCGLTop12[i].combVar=(float *)mem->Malloc(sizeof(float)*DSvecSize,true);
            }
            CGLTop12[i].combMean=(float *)mem->Malloc(sizeof(float)*DSvecSize,true);
            CGLTop12[i].combVar=(float *)mem->Malloc(sizeof(float)*DSvecSize,true);
            TempCGLTop12[i].combMean=(float *)mem->Malloc(sizeof(float)*DSvecSize,true);
            TempCGLTop12[i].combVar=(float *)mem->Malloc(sizeof(float)*DSvecSize,true);
        }
        for (int i=0;i<nmix*nmix;i++) {
            CGL[i].combMean=(float *)mem->Malloc(sizeof(float)*DSvecSize,true);
            CGL[i].combVar=(float *)mem->Malloc(sizeof(float)*DSvecSize,true);
        }
        for (int i=0;i<mono->monoPhnNum;i++) {
            if (i==DStee) continue;
            for (int j=0;j<3;j++) {
                if (DStrees[i][j]) {
                    /* normal models */
                    printf("Now we are processing %d exstate's %dth state, start newstate=%d\n",i,j,newstate);
                    newstate=VocMergeNodes_M(&DStrees[i][j]->root,++DStrees[i][j]->root.magic,newstate);
                    temp_node=VocMergeNodes_Refine(&DStrees[i][j]->root,++DStrees[i][j]->
        root.magic,temp_node);
                }
            }
        }
        mem->Free(CGL);
        mem->Free(FinalCGLTop12);
        mem->Free(CGLTop12);
        mem->Free(TempCGLTOP12);
        mem->Free(idx1);
        mem->Free(idx2);
        return 1;
    }
    DSizeModel::DSizeModel( ) { }
    void DSizeModel::Initialize(int tee, DcsTree ***trees, int vecSize, int hmmMix, aHMMDcsTreeNode
    *dnodes,
    int nodeNum, bool isbhat) {
        nmix=hmmMix;
        DStee=tee;
        bhat=isbhat;
        DSvecSize=vecSize;
        DStrees=trees;
        DSdcsNodes=dnodes;
        DSnodeNum=nodeNum;
    }
```

Thus, a method and system to scale a decision tree-based hidden markov model (HMM) for speech recognition. The method and system described are particularly suitable for automatic speech recognition systems (ASR). In the forego-

What is claimed is:

1. A method comprising:
scaling a decision tree-based acoustical model which is based on a vocabulary, wherein the scaling merges at least one node of the decision tree-based acoustical model with a parent node of the at least one node based on whether the at least one node represents a subset of the vocabulary which is used in a given task, wherein the merging occurs independent of whether the parent node of the at least one node represents a subset of the vocabulary which is used in the given task;
receiving speech information of the given task; and
processing the received speech information based on the scaled decision tree-based acoustical model.

2. The method of claim 1, wherein merging the at least one node based on whether the at least one node represents a subset of the vocabulary which is used in a given task includes merging the at least one node with the parent node if at least one descendant node of the parent node does not represent a subset of the vocabulary which is used in the given task.

3. The method of claim 1, further comprising:
adapting the scaled decision tree-based acoustical model for the given task.

4. A system comprising:
a memory to store a decision tree-based acoustical model which is based on a vocabulary;
a processor to scale the decision tree-based acoustical model, wherein the scaling merges at least one node of the decision tree-based acoustical model with a parent node of the at least one node based on whether the at least one node represents a subset of the vocabulary which is used in a given task, wherein the merging occurs independent of whether the parent node of the at least one node represents a subset of the vocabulary which is used in the given task;
an input device to receive speech information of the given task; and
a signal processor to process the received speech information based on the scaled decision tree-based acoustical model.

5. The system of claim 4, wherein the decision tree-based acoustical model is a decision tree-based hidden markov model (HMM).

6. The system of claim 4, wherein the processor is to adapt the scaled decision tree-based acoustical model for the given task.

7. A computer-readable medium having instructions stored thereon, which if executed by a processor, cause the processor to perform the operations comprising:
scaling a decision tree-based acoustical model which is based on a vocabulary, wherein the scaling merges at least one node of the decision tree-based acoustical model with a parent node of the at least one node based on whether the at least one node represents a subset of the vocabulary which is used in a given task, wherein the merging occurs independent of whether the parent node of the at least one node represents a subset of the vocabulary which is used in the given task;
receiving speech information of the given task; and
processing the received speech information based on the scaled decision tree-based acoustical model.

8. The computer-readable medium of claim 7, further providing instructions, which if executed by a processor, cause the processor to perform the operations of:
scaling the decision tree-based acoustical model based on a hidden markov model (HMM) for the given task.

9. The computer-readable medium of claim 7, further providing instructions, which if executed by a processor, cause the processor to perform the operations of:
adapting the scaled decision tree-based acoustical model for the given task.

10. A method comprising:
collecting a vocabulary knowledge used in a given task; and
trimming down a general acoustical model, wherein at least one node of the general acoustical model is merged with a parent node of the at least one node based on whether the at least one node represents a subset of the vocabulary knowledge used in the given task, wherein the merging occurs independent of whether the parent node of the at least one node represents a subset of the vocabulary knowledge used in the given task;
receiving speech information of the given task; and
processing the received speech information based on the trim-down general acoustical model.

11. The method of claim 10, further comprising:
adapting the trim-down general acoustical model for the given task.

12. The method of claim 11, wherein the adapting the trim-down general acoustical model includes:
collecting adaptation data, the adaptation data being related to the given task; and
adapting the trim-down general acoustical model to a task dependent acoustical model using the adaptation data.

13. The method of claim 12, further comprising:
interpolating the trim-down general acoustical model with the task dependent acoustical model to obtain a task specific acoustical model.

14. The method of claim 10, wherein the general acoustical model is a hidden markov model (HMM).

15. A system comprising:
a memory to store a general acoustical model;
a processor to collect a vocabulary knowledge used in a given task and to trim down the general acoustical model, wherein at least one node of the general acoustical model is merged with a parent node of the at least one node based on whether the at least one node represents a subset of the vocabulary knowledge used in the given task, wherein the merging occurs independent of whether the parent node of the at least one node represents a subset of the vocabulary knowledge used in the given task;
an input device to receive speech information of the given task; and
a signal processor to process the received speech information based on the trim-down general acoustical model.

16. The system of claim 15, wherein the processor is further to adapt the trim-down general acoustical model for the given task.

17. The system of claim 16, wherein the processor is further to collect adaptation data, the adaptation data being related to the given task and adapt the trim-down general acoustical model to a task dependent acoustical model using the adaptation data.

18. The system of claim 17, wherein the processor is to interpolate the trim-down general acoustical model with the task dependent acoustical model to obtain a task specific acoustical model.

19. The system of claim 15, wherein the general acoustical model is a hidden markov model (HMM).

20. A computer-readable medium having instructions stored thereon, which if executed by a processor, cause the processor to perform the operations comprising:
   collecting a vocabulary knowledge used in a given task; and
   trimming down a general acoustical model, wherein at least one node of the general acoustical model is merged with a parent node of the at least one node based on whether the at least one node represents a subset of the vocabulary knowledge used in the given task, wherein the merging occurs independent of whether the parent node of the at least one node represents a subset of the vocabulary knowledge used in the given task;
   receiving speech information of the given task; and
   processing the received speech information based on the trim-down general acoustical model.

21. The computer-readable medium of claim 20, further providing instructions, which if executed by a processor, cause the processor to perform the operations of:
   adapting the trim-down general acoustical model for the given task.

22. The computer-readable medium of claim 21, further providing instructions, which if executed by a processor, cause the processor to perform the operations of:
   collecting adaptation data, the adaptation data being related to the given task; and
   adapting the trim-down general acoustical model to a task dependent acoustical model using the adaptation data.

23. The computer-readable medium of claim 22, further providing instructions, which if executed by a processor, cause the processor to perform the operations of:
   interpolating the trim-down general acoustical model with the task dependent acoustical model to obtain a task specific acoustical model.

* * * * *